(No Model.)
M. B. MARSHALL.
FISH TRAP.
No. 254,989. Patented Mar. 14, 1882.
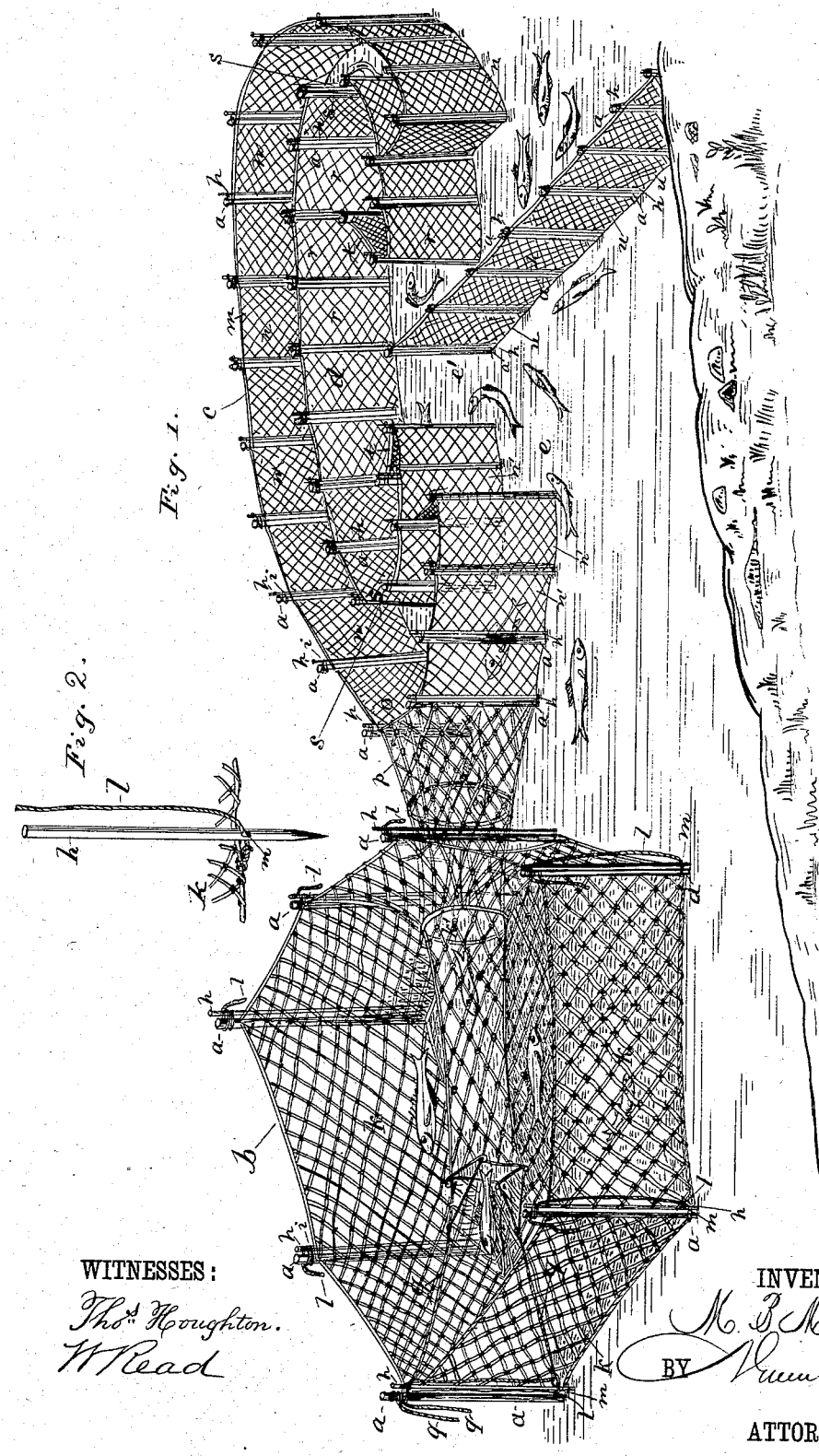
WITNESSES:
Thos. Houghton
W. Read
INVENTOR:
M. B. Marshall
BY
ATTORNEYS.

UNITED STATES PATENT OFFICE.

MAJOR B. MARSHALL, OF VIENNA, MARYLAND.

FISH-TRAP.

SPECIFICATION forming part of Letters Patent No. 254,989, dated March 14, 1882.

Application filed January 16, 1882. (No model.)

*To all whom it may concern:*

Be it known that I, MAJOR B. MARSHALL, of Vienna, in the county of Dorchester and State of Maryland, have invented a new and Improved Fish-Trap; and I do hereby declare that the following is a full, clear, and exact description of the same, reference being had to the accompanying drawings, forming part of this specification, in which—

Figure 1 represents a perspective view of my improved fish-trap, and Fig. 2 a detail view.

My invention relates to improvements in fish-traps; and it consists in the peculiar arrangement and construction of the parts, as hereinafter more fully set forth.

In the accompanying drawings, $a$ represents a series of stationary poles driven into the bed of a river, near one of its banks, so as to form in outline preferably a spear-head, $b$, two concentric oblong figures, $c\ d$, provided with openings $e\ e'$ in their sides, lying opposite each other, and a row of stationary poles, $a$, leading from the bank of the stream to the inner opening, $e'$.

$h\ h$ represent a series of runner-poles inserted in the bed of the stream, each alongside of and parallel to a stationary pole, $a$, to which it is lashed at its top by a cord, $i$, thus securing each stationary pole to its runner-pole. $k$ represents a net, closed at its sides and bottom, of the form and configuration of the spear-head $b$, and provided at each of its angles at the bottom of the net with cords $l$, which pass through holes $m$, made in each of the runner-poles at the bottom of the stream. The cords are thence passed upward and secured to the upper ends of the stationary poles. The upper edge of the net $k$ is secured to the stationary poles near their upper ends. By this construction the net can be drawn down into position by the cords, and when the net becomes filled with fish the cords $l$ may be unlashed from their stationary posts and the net raised and the fish contained therein removed.

The outer oblong figure, $c$, formed by the stationary and runner poles $a\ h$, is inclosed on its outer side by a net, $n$, secured at its upper edge to the upper ends of the stationary poles $a$, and at its lower edge to the lower ends of the runner-poles $h$. The net $n$ extends from the stationary pole opposite the spear-head entirely around the outer side of the oblong figure $c$ and around its opposite end a short distance, where it joins abruptly the inner oblong figure, $d$. The inner side of the oblong figure $c$, formed by the stationary and runner poles $a\ h$, is inclosed partly by the extension of the net $n$, above described, and by the net $n'$, extending from one of the stationary poles opposite the spear-head around the inner line of the stationary and runner poles directly opposite the bank a short distance, where it abruptly turns inward and is joined to the inner oblong figure, $d$. The outer oblong figure, $c$, has an opening for the passage of fish opposite the spear-head, and is closed at its opposite end.

To the stationary and runner poles, at the opening $o$, is secured a netted funnel, $p$, which passes through an opening in the end of the net $k$, which funnel passes through the opening $k$ into the spear-head, and is provided with cords $q$ at its outer end, by means of which it may be lashed in place to the stationary pole at the point of the spear-head to retain it in place, or may be unlashed from the stationary pole and thrown over the rear edge of the net $k$ when it is desired to remove the fish.

The funnel may be kept extended for the passage of fish by hoops or arches inserted in the bottom of stream and straddling the funnel, to which the funnel is secured to keep it open.

The inner oblong figure, $d$, formed by the stationary and runner poles $a\ h$ and concentric with the oblong figure $c$, is inclosed by a net, $r$, extending from the top to the bottom of the stationary and runner poles $a\ h$ to retain the fish. The oblong figure $d$ has openings $s\ s$ at each end for the passage of fish, and offsets $t\ t$ projecting inwardly and covered by the net $r$.

$u$ represents a net secured to the upper and lower ends of the stationary and runner poles $a\ h$, leading from the bank of the stream to the middle of the openings $e\ e'$ in the oblong figures $c\ d$. This net $u$ acts as a hedge or obstruction to the passage of fish up or down the stream. The fish thence pass through the passages $e$ into the inner oblong figure, $d$, and pass thence through the passages $s\ s$ into the funnel, and thence into the spear-head. To remove the fish from the spear-head the outer end of the funnel is raised and thrown over the rear of the net $k$. The cords $l$ of the net $k$ are unlashed and the net raised.

The nets $k$ and $n$ are attached to the runner-poles, when it is desired to set the nets, as follows: The upper edges of the nets being secured to the stationary poles near their upper ends, as described above, the cords $l$ at the lower ends of the nets are passed through the holes $m$ in the runner-poles and drawn upward along the runner-poles, which are then inserted in the bottom of the stream alongside the stationary poles. The cords $l$ are then drawn upward, sinking or drawing down the nets, and the cords $l$ are secured to the stationary poles near their upper ends, which stationary poles are also lashed to the runner-poles by the cords $i$, and the nets are set.

I am aware that a seine provided with a netted or closed bottom has heretofore been employed; and I am also aware that a folding net combined with an adjustable fish-pound to close the opening in the heart is not new; and I am further aware that a net with a closed bottom and having endless lines secured at their ends to the upper and lower ends of the corners or angles of the net, which lines pass through upper and lower holes in stakes planted in the stream, to which the corners of the net are secured, by means of which endless lines passing through holes in the stakes the bottom of the net may be raised up or hauled down, has heretofore been employed, and I therefore lay no claim to such inventions.

What I claim as my invention is—

1. The combination, with the stationary poles $a$ and runner-poles $h$, each provided with a hole, $m$, near its lower end, of the spear-head-shaped net $k$, closed at its sides and bottom, and having cords $l$ at the angles of its bottom, substantially as described, and for the purpose set forth.

2. The combination, with the spear-head-shaped net $k$, provided with the opening $k'$, and secured to the stationary and runner poles $a$ $h$, of oblong figure $c$, inclosed by nets $n$ $n'$, and provided with the opening $e$ $o$, funnel $p$, opening into the oblong figure $c$ and spear-head, oblong figure $d$, concentric with the figure $c$, open at both ends, inclosed by the net $r$, and provided with the opening $e'$, and net $u$, extending from the opening $e'$ to the bank, and secured to the stationary and runner poles $a$ $h$, substantially as described, and for the purpose set forth.

The above specification of my invention signed by me in the presence of two subscribing witnesses.

M. B. MARSHALL.

Witnesses:
SOLON C. KEMON,
JOHN T. LAWRENCE.